TRANSVERSE NEGATIVE MOBILITY DEVICES

Filed Sept. 6, 1968 4 Sheets-Sheet 1

INVENTORS
HERBERT KROEMER
MEGHA SHYAM
BY Roger S. Borovoy
Alan H. MacPherson
ATTORNEYS INVENTORS
HERBERT KROEMER
MEGHA SHYAM
BY Roger S. Borovoy
Alan H. MacPherson
ATTORNEYS June 2, 1970 H. KROEMER ET AL 3,516,019

TRANSVERSE NEGATIVE MOBILITY DEVICES

Filed Sept. 6, 1968 4 Sheets-Sheet 3

INVENTORS
HERBERT KROEMER
MEGHA SHYAM
BY Roger S. Borovoy
Alan H. MacPherson
ATTORNEYS

INVENTORS
HERBERT KROEMER
MEGHA SHYAM
BY
ATTORNEYS

United States Patent Office 3,516,019

Patented June 2, 1970

3,516,019

TRANSVERSE NEGATIVE MOBILITY DEVICES

Herbert Kroemer, Menlo Park, and Megha Shyam, Los Altos, Calif., assignors to Fairchild Camera and Instrument Corporation, Syosset, N.Y., a corporation of Delaware Filed Sept. 6, 1968, Ser. No. 757,879
Int. Cl. H01l *11/00;* H03b *7/00;* H03f *3/14*
U.S. Cl. 331—107 17 Claims

ABSTRACT OF THE DISCLOSURE

In the presence of a proper longitudinal bias field, a sample of selectively doped germanium, cut in a (110) plane with its longitudinal axis substantially coinciding with a selected [110] crystal axis, exhibits a transverse negative resistance in a direction perpendicular to the longitudinal axis. As a result, a small transverse voltage placed across one end of the sample produces a transversely polarized domain which, under the influence of the bias field, drifts along the longitudinal axis of the sample. This specially cut sample, with appropriate circuitry, can thus be used as a delay line, a shift register, an oscillator, or, because under certain conditions the domain increases in size with time, as a traveling wave amplifier.

BACKGROUND OF THE INVENTION

Field of the invention

This invention relates to semiconductor devices and, in particular, to semiconductor devices exhibiting transverse negative differential mobility.

Description of the prior art

Semiconductor devices containing peaks and valleys in their voltage-current characteristics are well-known. Because of these characteristic peaks and valleys, these devices, when properly biased, exhibit a so-called negative resistance to small amplitude A-C voltage perturbations in the direction of the bias field about the bias point. Thus, in a properly biased tunnel diode, a typical negative resistance device, a small increase in voltage produces a proportionate decrease in current. By properly choosing the bias voltage, this negative resistance effect, which is essentially a property of the interface between the P and the N type materials of the diode, can be used to make either a bi-stable device capable of exhibiting two different impedances, or an unstable device such as an oscillator.

SUMMARY OF THE INVENTION

This invention, on the other hand, concerns a semiconductor device which, under certain conditions, exhibits a negative resistance in a direction perpendicular to that of an applied electric field rather than in the direction of the applied field. This so-called "transverse negative resistance" is not just a negative resistance to small signal perturbations about a D-C bias point, but rather is a substantially linear negative resistance which passes through the zero of the transverse voltage-current characteristic. Moreover, the negative resistance of this invention is not a property of a semiconductor interface as in the case of the tunnel diode negative resistance, but rather is apparently a bulk field effect.

According to this invention, a selectively-doped sample of a selected semiconductor material, particularly germanium, is cut in a (110) plane with the longitudinal axis of the sample substantially aligned along a [110] crystal axis. In the presence of a selected electric bias field along the longitudinal axis, the sample exhibits a negative resistance in a direction perpendicular to the longitudinal axis of the sample.

Because of this so-called "transverse negative resistance," a small transverse voltage in one direction produces a corresponding transverse current in the opposite direction. This transverse current, once started, continues until a domain, formed by the accumulation and depletion of electrons on opposite sides of the sample by the transverse current, reaches its maximum value, that is, becomes fully "polarized." Hereafter this domain is called a "transverse domain." Under the influence of the longitudinal bias field, this transverse domain travels, at a drift velocity on the order of $10^7$ cm./sec., along the longitudinal axis of the sample.

In addition, because a finite time is necessary for the transverse domain to become fully polarized, this domain increases in magnitude as it drifts along the longitudinal axis of the sample. Thus, a small transverse voltage at one end of the sample appears as a large transverse voltage at the other end of the sample. In effect, the sample acts as a traveling wave amplifier.

Because a transverse domain, injected into the sample by contacts on two sides of the sample in a plane perpendicular to its longitudinal axis, travels at the electron drift velocity along the longitudinal axis of the sample, other contacts placed on the sides of the sample downstream from the injection point can be used to detect the arrival of this domain. Thus, the semiconductor samples of this invention can be used with appropriate input, output, and bias circuitry, to form shift registers or delay lines.

Interestingly, an output pulse once injected into the sample travels, under the influence of the bias field, the length of the sample in a time that decreases slightly with increasing strength of the bias field. This pulse, when detected at the output contacts on the sample, can be reshaped and then fed back to the input contacts on the sample. The frequency of arrival of this recirculated pulse at the output contacts is a function of the strength of the bias field. As a result, the sample, together with associated input, output, and feedback circuitry, is, in essence, an oscillator whose frequency is determined by the strength of the bias field.

The semiconductor devices of this invention are simple yet rugged. Because these devices make use of bulk field properties, they are particularly useful in applications requiring high frequency responses above 10 megahertz and on up into the gigahertz frequency region. They are well suited for use with signals at microwave frequencies.

This invention will be more fully understood in light of the following detailed description taken together with the drawings.

DESCRIPTION OF THE PREFERRED EMBODIMENTS

Figure 1A:
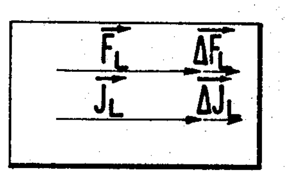
FIGS. 1*a* and 1*b* illustrate the incremental currents produced in two types of semiconductor materials in response to incremental changes in electric fields.
Figure 2A:
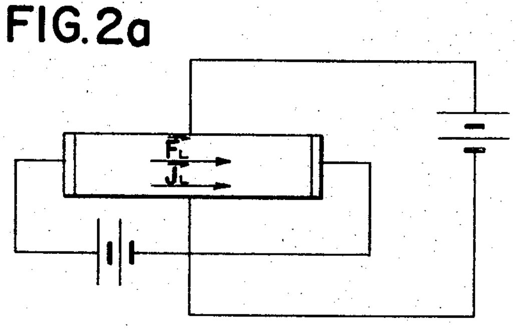
FIG. 2*a* shows schematically the device of this invention.
Figure 1B:
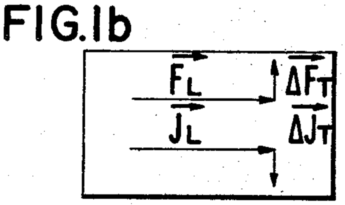
Figure 2B:
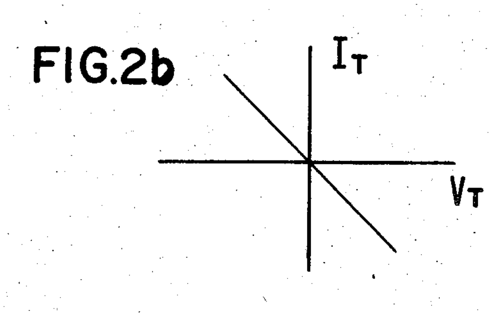
FIG. 2*b* shows the transverse voltage-current characteristic of the device shown in FIG. 2*a* when this device is properly biased in a longitudinal direction.

Before describing in detail the embodiments of this invention, certain concepts useful in understanding the operation of these embodiments will be defined. In a typical body of one type of semiconductor material, a current of density $\vec{J}_L$ flows through the body in response to, and in the direction of, an applied longitudinal electric field $\vec{F}_L$. (Throughout this specification the field and current density will be written as vector quantities to emphasize that these quantities have both magnitude and direction.) As shown in FIG. 1*a*, a small change $\Delta\vec{F}_L$ in the electric field in a selected direction produces a proportionate change $\Delta\vec{J}_L$ in the current density in the same direction. However, as shown in FIG. 1*b*, which represents schematically the semiconductor device of this invention, a small change $\Delta\vec{F}_T$ in the electric field in a direction perpendicular to the longitudinal field $\vec{F}_L$ results in a small change $\Delta\vec{J}_T$ in current in the opposite direction, provided the electric field $\vec{F}_L$ is within a selected range of values. The resulting so-called "transverse negative differential mobility" occurs only when the sample of semiconductor material is cut in a (110) plane—that is, when at least one of the surfaces of the sample is in a given (110) plane which in turn is perpendicular to a given [110] axis—and when the longitudinal axis of the sample of semiconductor material—typically germanium, for reasons to be discussed later, is aligned with this [110] crystallographic axis of the seminconductor material.

Figures 3A, 3B, 4:
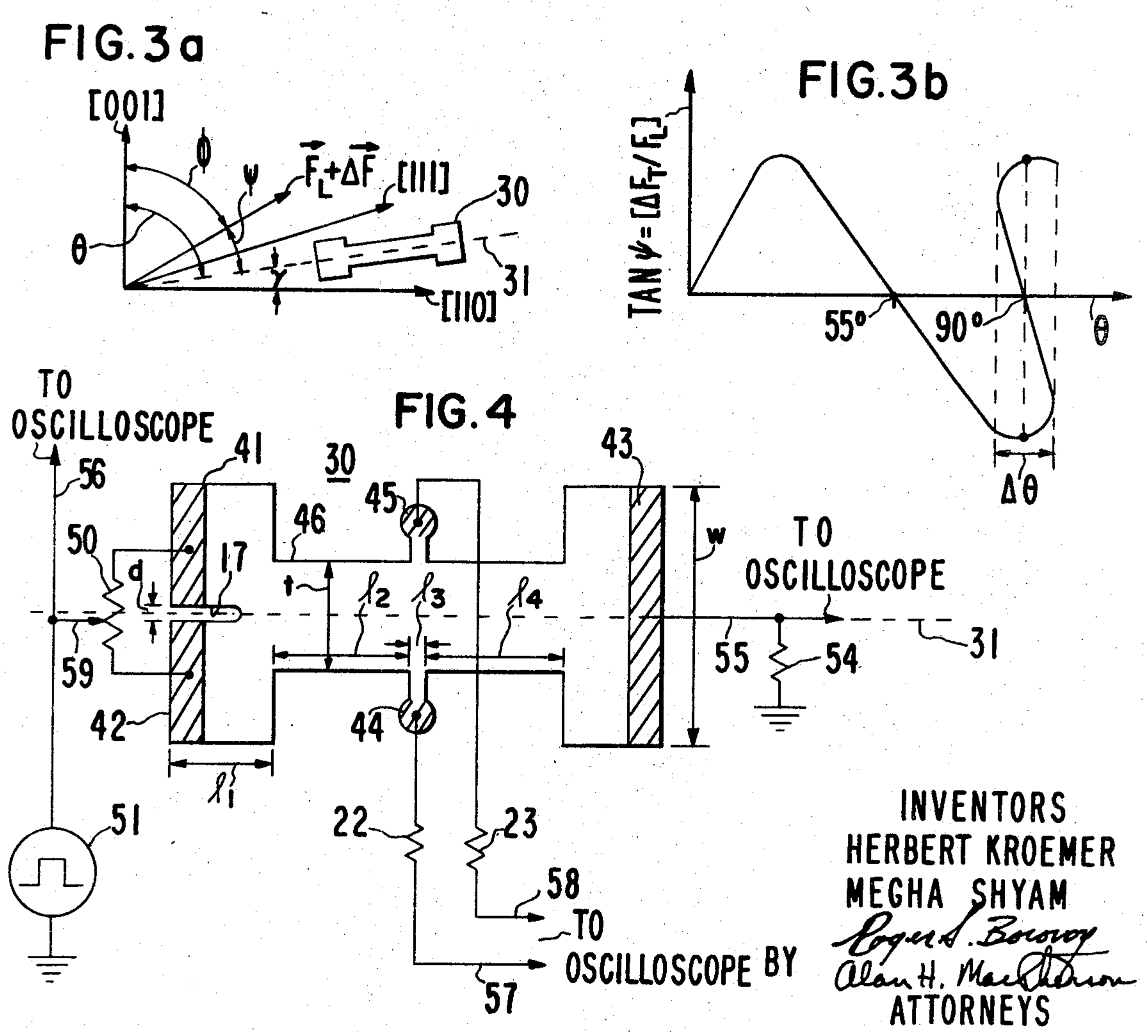
FIG. 3*a* shows the orientation of the longitudinal axis of the device of FIG. 2*a* with respect to selected crystal axes.
FIG. 3*b* shows graphically the relationship of the angle between the applied electric field and the longitudinal axis of the device of FIG. 3*a* to the angle between a selected crystal axis and the longitudinal axis of this device.
FIG. 4 shows one embodiment of the device of this invention.

FIG. 3*a* shows schematically the relationship between the crystallographic and body axes of the semiconductor device of this invention. In this figure, the three principal crystallographic axes of symmetry in a diagonal plane of a cube, for example, the [001], the [111], and the [110] axes, are shown together with a sample 30 of semiconductor material exhibiting transverse negative differential mobility. The longitudinal axis 31 of sample 30 is shown in dashed lines. The angle $\gamma$ between this longitudinal axis and the [110] crystallographic axis is greatly exaggerated for illustrative convenience. The direction of the composite electric field $\vec{F}_L+\Delta\vec{F}_T$ is also shown schematically in FIG. 3*a*.

Three angles are of importance in explaining this invention first, the angle $\phi$ between the [001] axis and the composite electric field $\vec{F}_L + \Delta\vec{F}_T$; second, the angle $\theta$ between the [001] axis and the longitudinal axis 31 of sample 30; and finally, the angle $\psi$ between the composite electric field $\vec{F}_L+\Delta\vec{F}_T$ and the longitudinal axis 31 of sample 30. The angle $\gamma$ between the longitudinal axis 31 of sample 30 and the [110] crystal axis will be of use later.

FIG. 3*b* shows the relationship between the angle $\psi$ and the angle $\theta$. Of interest in FIG. 3*b* is that the angle $\psi$ is triple valued for values of $\theta$ within a range of about $\pm 3$ degrees of 90 degrees. According to FIG. 3*b*, if a crystal of germanium is cut so that the longitudinal axis 31 of the resulting sample 30 makes an angle $\theta$ of 90 degrees $\pm 3$ degrees with the [001] crystal axis, the composite electric field $\vec{F}_L+\Delta\vec{F}_T$ can assume any of three angles with axis 31, only two of which are stable. However, preferably the tolerance on $\theta$ is held to $\pm\frac{1}{2}$ degree to obtain greater certainty that $\theta$ is within the range yielding three possible angles for the composite field $\vec{F}_L+\Delta\vec{F}_T$. Because of the triple-valued nature of the curve in FIG. 3*b*, the composite fiield $\vec{F}_L+\Delta\vec{F}_T$ has two stable positions for $\theta=90°\pm3°$. As the transverse field $\Delta\vec{F}_T$ across sample 30 is changed in magnitude and direction, the transverse current $\Delta\vec{J}_T$ must vary in the opposite direction. This creates a stable transverse domain from electron accumulation and depletion on the two sides of the germanium sample.

Figure 5A:
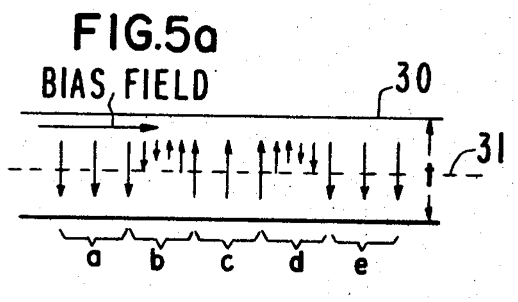
FIGS. 5*a* and 5*b* illustrate the shape and cross-section of a typical transverse domain in a body of germanium.

FIG. 5*a* shows one possible arrangement of transverse domains produced in a body 30 of germanium by periodically reversing the polarity of a transverse voltage in the presence of a longitudinal bias field. Three separate domains are shown; these domains are labeled *a*, *c*, and *e* and are represented by arrows pointing vertically down, vertically up and vertically down, respectively. Domains *a* and *c* are separated by transition region *b* while domains *c* and *e* are separated by transition region *d*.

Figure 5B:
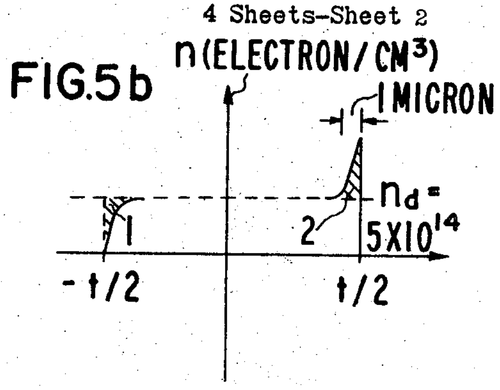

FIG. 5*b* shows a possible electron distribution along the cross-section shown in FIG. 5*a*. In this figure, the abscissa represents the width *t* of the body 30 of semiconductor material shown in FIG. 5*a*. The origin of the abscissa is placed on longitudinal axis 31 of body 30. The ordinate represents the number of electrons per cubic centimeter of semiconductor material distributed along the the cross-section. The transverse electric field vector points from the left of FIG. 5*b* to the right. Normally, in the absence of a bias field applied along the longitudinal axis 31 of body 30 of semiconductor material, the electron concentration across a typical cross-section of this material is just the impurity concentration. In this case, the impurity concentration is approximately $5\times10^{14}$ electrons per cubic centimeter.

As shown in FIG. 5*b*, the applied electric field bunches electrons in region 2 on the right-hand edge of the semiconductor material 30 and, simultaneously, depletes an equal area 1 of electrons on the left-hand edge of this semiconductor material. The thickness of the region 2 in which the electrons are bunched typically is on the order of 1 micron. This thickness is determined by both the diffusion forces which tend to uniformly redistribute bunched electrons and the net field force which tends to bunch the electrons together at the edge of the material, thereby creating the transverse domains of this invention. The areas of regions 1 and 2 are equal.

Figure 8A:
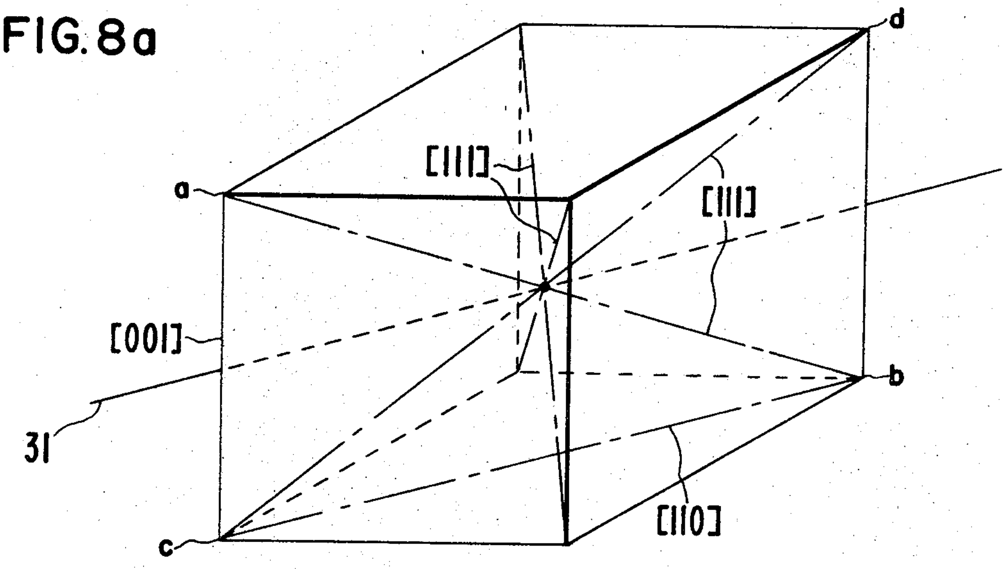
FIGS. 8*a* and 8*b* are useful in explaining the theory behind the operation of the devices of this invention; and, FIG. 9 shows an oscillator using the principles of this invention.

One explanation for the existence of a transverse domain in response to the presence of a selected bias field along the longitudinal axis of the body of selectively doped germanium is based upon the energy band structure of the conduction band of germanium. Germanium is a multi-valleyed semiconductor material; that is, germanium contains several classes of electrons, the electrons in each class possessing different properties. In particular, the effective mass of an electron in germanium is a function of direction, i.e., the germanium is "anisoptropic." In a cube of germanium the effective mass of an electron in a given [111] direction (see FIG. 8*a*) is about 20 times the effective mass of the same electron in a direction at right angles to that [111] axis. As shown in FIG. 8*a*, the [111] directions are the diagonals across the interior of the cube.

Figure 8B:
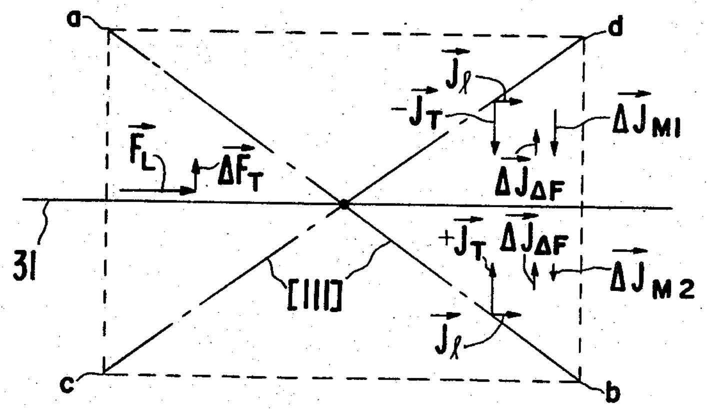

Now, if a force (i.e., an electric field) is applied to an electron at a substantial angle to both the [111] axis and an axis perpendicular to this [111] axis (for example, if the field force $\vec{F}_L$ is applied along the longitudinal axis 31 of the cube as shown in FIG. 8*b*) then the resulting acceleration of the electron is not in the direction of the field, but rather is in another direction located close to the direction in which the electron has the lowest effective mass. For an effective mass difference of 20 in the two relevant perpendicular directions, the resulting acceleration is almost parallel to the direction in which the electron has the lower effective mass.

However, the applied field is not the only factor influencing the velocity of the electrons. In N-type germanium at room temperature doped with an impurity concentration of about $5\times10^{14}$ cm.$^{-3}$ and with a longitudinal field strength $\overline{F}_L$ greater than about 500 volts per centimeter, the electrons are so-called "hot" electrons. Tilting the electric field an amount $\Delta\overline{F}_T$ as shown in FIG. 8*b*, results in cooling the electrons for which the field gets tilted in the direction of high effective mass and heating the electrons for which the field gets tilted in the direction of low effective mass. Now the mobility of electrons in germanium decreases as electron temperature increases. As a result, as an electron is accelerated in the direction in which it has the lower mass, its mobility becomes considerably less.

On the other hand, a crystal cube contains four full [111] axes which intersect at the middle of the cube. An electric field $\overline{F}_L$ aligned perfectly along the longitudinal axis 31, as shown in FIG. 8*b*, bisects the angles produced by two of the four [111] axis and produces equal and opposite currents, $+\overline{J}_T$ and $-\overline{J}_T$, in the transverse direction from the two energy valleys in the *acbd* plane—a (110) plane. These currents cancel. But the small transverse field $\Delta\overline{F}_T$, shown in FIG. 8*b*, also produces incremental currents from the two energy valleys along the [111] axes. These incremental currents, labeled $\Delta\overline{J}_{\Delta F}$ in FIG. 8*b*, affect oppositely the transverse currents $+\overline{J}_T$ and $-\overline{J}_T$ produced by the longitudinal bias field. In addition, incremental transverse currents, $\Delta\overline{J}_{m1}$, and $\Delta\overline{J}_{m2}$, due to the change in electron mobility in the transverse direction are produced by the currents $\Delta\overline{J}_{\Delta F}$ superimposed on the currents $+\overline{J}_T$ and $-\overline{J}_T$. The resultant of all these incremental currents is, in fact, negative, thereby creating the net transverse current $\Delta\overline{J}_T$ in a direction opposite to the direction of the transverse field $\Delta\overline{F}_T$. This negative current thus depends on strong anisotropies in the semiconductor material. Germanium, with a 20 to 1 ratio of the electron masses along the [111] axes and along directions perpendicular to these axes, has the required strong anisotropies.

Now to generate the transverse bias fields, the electric field along the longitudinal axis of the body of semiconductor material must be perturbed. This perturbation occurs naturally in the body of semiconductor material due to imperfections frozen into the crystal lattice structure during its formation or due to internal noise in the device. All that is needed to tilt the bias field is a small perturbation. Once this perturbation occurs, a transverse domain will come into existence. Its polarity, however, will be random from crystal to crystal, reflecting the random nature of the perturbation. But, according to this invention, by superimposing a transverse voltage on the body of semiconductor material subject to the proper longitudinal bias field, a transverse domain can be created with the desired polarity. The time necessary for the electrons to bunch together to create this transverse domain once a transverse bias voltage has been applied to the body of semiconductor material is a function of the dielectric relaxation time which is a function of the dielectric constant and the transverse conductivity of the material. The transverse conductivity of the material in turn is a function of the number of charge carriers in the material.

Once a transverse domain has been created in a body of semiconductor material, the domain drifts along the longitudinal axis of the device in response to the influence of the longitudinal bias field. This traveling of the domain along the body of germanium in the presence of the longitudinal bias field will, as explained later, serve as the basis for several devices based on the transverse negative differential mobility effect described above.

FIG. 4 shows one embodiment of this invention in which a transverse negative differential field was generated. Device 30 consists of a body 46 of N-type germanium held at room temperature with ohmic contacts 41, 42, and 43 at the left and right ends of the device. The main body of the device consists of antimony-doped germanium with a resistivity of approximately 1 to 4 ohms-centimeter. The longitudinal axis 31 of device 30 coincides within ½ degree with the [110] direction (FIG. 3*a*). Ohmic contacts 41, 42, 43, 44, and 45 were made by alloying evaporated gold-antimony to the germanium. Contacts 41 and 42 are separated by slot 17. Attached to contacts 41 and 42 are the two ends of 10 ohm potentiometer resistor 50. Arm 59 slides along resistor 50 to vary the voltage from source 51 applied to the split contacts 41 and 42. Lead 55 attached to ohmic contact 43 returns the bias current through 50 ohm resistor 54 to signal source 51.

Typical dimensions of specimen 30 are a slot 17 width *d* of 0.2 millimeter, a thickness *t* of .6 millimeter, a central body length $(l_2+l_3+l_4)$ of 1.35 millimeters, an end thickness $l_1$ of 1.25 millimeters and a width *w* of 4 millimeters. The thicknesses of the leads from ohmic contacts 44 and 45 to the central core of the body are typically 0.15 millimeter and the distance $l_2$ from the transverse leads to the end areas is typically 0.5 millimeter.

A voltage from signal source 51 is applied to sample 30 through arm 59 in contact with potentiometer resistor 50. By varying the position of arm 59 on resistor 50, the voltage applied to contact 41 can be made to differ from the voltage applied to contact 42. As a result, the electric field induced in the body of sample 30 can be made to vary in direction through the body of the sample.

The existence of a transverse domain in the sample was demonstrated by applying 2 to 20 nanosecond flat-topped pulses with a repetition rate of 60 pulses per second to the sample through contacts 41 and 42. A short time later, a transverse potential was detected in sample 30 by means of leads 57 and 58 connected through 112K ohm resistors 22 and 23 to ohmic contacts 44 and 45 respectively. Contacts 44 and 45 are located on a line perpendicular to the longitudinal axis 31 of specimen 30.

For potentiometer positions near one end of their range, the transverse voltage measured at contacts 44 and 45 rapidly switched its polarity about 5 nanoseconds after the beginning of the pulse indicating the traveling, along axis 31, of a transverse domain opposite in polarity to the initial transverse domain in the body. Movement of the potentiometer setting toward the opposite end of its range caused this polarity reversal to disappear abruptly at some position near the center of the potentiometer. The entire transverse voltage disappeared for fields greater than 10 kilovolts per centimeter.

The effect appears quite sensitive to angular deviations of the longitudinal axis of the structure from the [110] direction and to other departures from symmetry. For angular deviations of the field from the longitudinal axis of the sample greater than about 3 degrees, the transverse voltage could not be switched.

To avoid arcing, the sample 30 was kept under silicone oil. The electric field strength along the longitudinal axis of the sample was 4 to 10 kilovolts per centimeter. Experiments indicate that the presence of a field in this range is necessary for the existence of polarizable domains in a direction perpendicular to the longitudinal axis of the sample.

As described above, the initial transverse voltage and its switching of polarity are believed to be due to a transverse negative mobility and its associated space-charge instabilities. This conjecture is supported by the fact that a potentiometer-induced tilt in the longitudinal elecric field in a selected direction causes a polarization of opposite sign near the ohmic contacts 41 and 42 from the initial polarization at these contacts. When the electrons that support this opposite polarization arrive at the side arms 45 and 44, the transverse negative domains originally generated by imperfections in the crystal structure reverse. Experiments indicate a domain propagation velocity of about $.8\times10^7$ centimeters per second along the longitudinal axis of the device due to the longitudinal bias field.

But when the potentiometer-induced tilt in the electric field is in the opposite direction, no reversal in the transverse voltage is noted at side arms 44 and 45. This is because transverse negative domains of the same polarity as the potentiometer-induced tilt already exist in the device body 46 due to, for example, crystal imperfections.

Figure 6A:
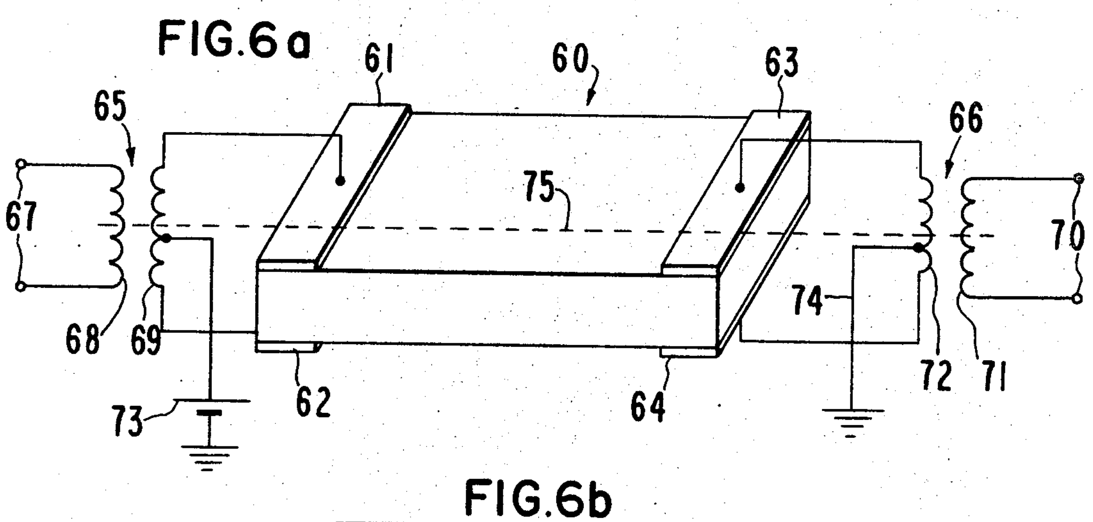
FIG. 6*a* shows a traveling wave amplifier using the principles of this invention.

A shift register delay line using the principles of this invention is shown in FIG. 6*a*. Here, body 60 of germanium, cut so that the longitudinal axis 75 of the body is approximately identical to the [110] axis of the crystal of germanium, is doped with a suitable impurity—typically antimony—to obtain a doping concentration of about $5\times10^{14}$ per cubic centimeter. Metal input contacts 61 and 62 are alloyed to the left-hand side of body 60 while metal output contacts 63 and 64 are alloyed to the right-hand side of body 60. The secondary winding 69 of input transformer 65 has its two terminals connected or alloyed to contacts 61 and 62. A bias source 73, typically a battery, is connected to secondary winding 69. A return path for the bias current is provided by lead 74 attached to primary winding 72 of output transformer 66.

A transverse domain representing a binary 1 or binary 0 is placed in body 60 by applying a short pulse from a source (not shown) to the input leads 67 of input winding 68. The resulting pulse of transverse voltage produced across body 60 from contact 61 to contact 62 creates a transverse domain which then proceeds to travel along the longitudinal axis 75 of material 60 in response to the longitudinal bias voltage from source 73. As this domain travels along the longitudinal axis 75, full polarization of the transverse domain occurs not between contacts 61 and 62 but rather at some point along the device. The polarizaiton distance, that is, the distance in which the transverse domain achieves full size, depends on the doping. The more electrons available, the faster the domain builds up, and thus the faster full polarization is achieved. To decrease the polarization speed the conductivity of the device is reduced, but, interestingly, as the doping is reduced the device is placed in the intrinsic range where the negative transverse mobility effect does not exist. Thus, when the resistivity of the device is 1 ohm-centimeter or less the negative transverse mobility effect of this invention is not obtained. Also, at resistivities above about 10 ohm-centimeters, holes appear and again the device does not exhibit negative transverse mobility.

Because as the domain is swept along the longitudinal axis 75 under the influence of the bias voltage from source 73, it increases in strength until it becomes fully polarized, a small input voltage at contacts 61 and 62 will be detected at contacts 63 and 64 as a much larger voltage. Thus, an output circuit attached to output leads 70 of secondary winding 71 will detect a much larger signal than originally placed in device 60. Device 60 thus can be considered a traveling wave amplifier as well as a delay line.

Figure 6B:
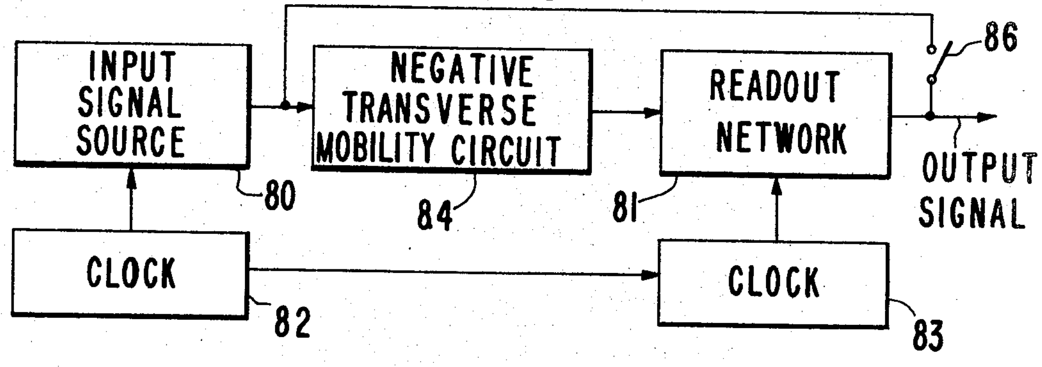
FIG. 6*b* shows a shift register using the principles of this invention.

FIG. 6*b* shows a delay circuit—suitable for use in a digital computer or a data processor—using the negative transverse mobility device 60 of FIG. 6*a* as the delay element. An input source 80 supplies a stream of pulses representing binary ones and zeros. Clock 82 controls the frequency of these pulses. Circuit 84, consisting of a properly cut germanium crystal with appropriate input, output, and bias circuitry, as shown for example in FIG. 6*a*, generates transverse domains of a first or second polarity representing respectively a binary one or binary zero in response to these input pulses. These pulses then travel through circuit 84 and, predetermined time later, emerge at the output lead and are detected by readout network 81. Network 81 is synchronized with the input signal source by clock 83 slaved to clock 82. Network 81, which typically comprises a pulse-shaping network and an amplifier, produces a stream of output pulses representing the delayed stream of input pulses from source 80. By closing switch 86, shown schematically, the output pulse from network 81 can be fed back to the input lead to circuit 84 and the delay circuit becomes a recirculating delay line.

Figures 7A, 7B:
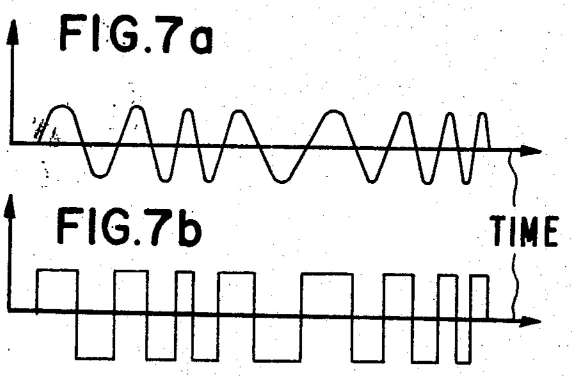
FIGS. 7*a* and 7*b* show graphically the operation of the device shown in FIG. 6*a*.

FIG. 7 shows two curves illustrating the input and output signals to the device 60 shown in FIG. 6*a* when this device is used as an amplifier for an FM signal. A frequency modulated carrier signal is shown in FIG. 7*a*. This input signal is imposed on input leads 67 of the primary winding 68 of input transformer 65 of the device 60 shown in FIG. 6*a*. As this frequency modulated carrier wave switches polarity, the domains produced in device 60 between contacts 61 and 62 likewise switch polarity but at the same time travel along the longitudinal axis 75 of the device toward the output contacts 63 and 64. By the time these domains reach the output contacts 63 and 64, they have become fully polarized. The resulting signal detected at contacts 63 and 64 resembles not the original frequency modulated carrier wave but rather, a series of positive and negative square wave pulses crossing the horizontal axis at points corresponding to the nulls of the original frequency modulated carrier. As a result, the frequency modulated carrier is converted into a frequency modulated square wave.

Figure 9:
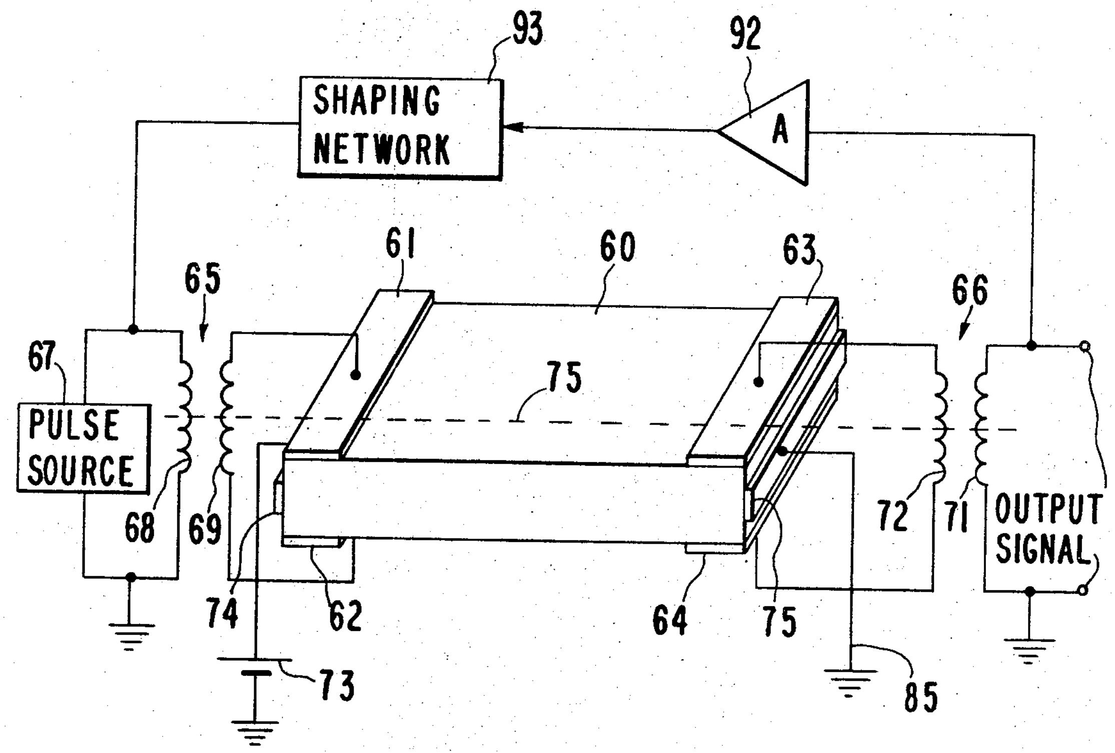

FIG. 9 shows an oscillator using the principles of this invention. Here, body 60 of germanium, cut in the (110) plane with the longitudinal axis 75 of the body approximately identical to the [110] axis of the germanium crystal, is doped with a suitable impurity—typically antimony—to obtain a doping concentration of approximately $5\times10^{14}$ per cubic centimeter. This concentration can vary about $4\times10^{14}$ cm.$^{-3}$ to about $1.5\times10^{15}$ cm.$^{-3}$. Metal input contacts 61 and 62, typically gold-antimony, are alloyed to the left-hand side of body 60 while metal output contacts 63 and 64 are alloyed to the righthand side of body 60. The secondary winding 69 of input transformer 65 has its two terminals connected or alloyed to contacts 61 and 62. The primary winding 72 of output transformer 66 has its two contacts connected or alloyed to contacts 63 and 64. A bias source 73, typically a battery, is alloyed or connected to bias contact 74 at the left end of body 60. A return path for the bias current is provided by lead 85 attached to bias contact 75 at the right-hand face of body 60. Alternatively, the bias source can be connected to body 60 by leads attached to secondary winding 69 and primary winding 72. All connections and contacts are ohmic.

A transverse domain representing a pulse is placed in body 60 by applying a pulse from source 67 to the input winding 68 of transformer 65. The resulting pulse of transverse voltage produced across body 60 from contact 61 to contact 62 creates a transverse domain which then proceeds to travel along the longitudinal axis 75 of material 60 in response to the longitudinal bias voltage from source 73.

When this transverse domain arrives at output contacts 63 and 64, a pulse is produced in primary winding 72 of transformer 66. A corresponding pulse is produced in secondary winding 71 of this transformer. This pulse is then fed back by a path from the secondary winding 71 to the input or primary winding on transformer 65. In the feedback path are placed amplifier 92 and shaping network 93 to amplify and reshape the pulse. By properly setting the gain in the feedback path, body 60 and the associated circuitry act as an oscillator. The pulse frequency at the output leads is a function of the strength of the bias field.

While structures using the negative transverse differential mobility of selectively cut crystals of germanium have been described in detail, other ways of biasing such germanium crystals and producing transverse negative domains in these crystals will be apparent in light of this disclosure. In addition, while antimony has been used as the dopant in the specially cut germanium crystals discovered to exhibit transverse negative mobility, other doping materials equivalent to antimony can be used, if desired. And while this invention has been described with the longitudinal axis of germanium aligned along the [110] crystal axis, those skilled in crystallography will recognize that there are eleven other axes in a cube of germanium equivalent to the [110] axis. The crystal of germanium can be cut in the plane corresponding to any one of these axes, and so long as the longitudinal axis of the cut crystal aligns substantially along the corresponding [110] axis, the transverse domains of this invention will be obtained.

What is claimed is:

1. Apparatus comprising:
a body of selectively doped semiconductor material cut in a (110) plane with the longitudinal axis of said body corresponding within a selected number of degrees to a selected [110] axis of said material;
means for producing a first electric field substantially along said longitudinal axis; and,
means for producing a second electric field approximately perpendicular to said longitudinal axis, thereby to produce a transverse domain in said body, said domain traveling along said longitudinal axis in response to said first electric field.

2. Apparatus as in claim 1 including:
means for detecting the arrival of said transverse domain at a selected position in said body.

3. Apparatus as in claim 2 in which said means for producing a first electric field produces a field with a strength between 4 to 10 kilovolts per centimeter along said longitudinal axis.

4. Apparatus as in claim 3 in which said selectively doped semiconductor material is germanium doped with antimony to ensure a resistivity between 1 to 4 ohm-centimeters.

5. Apparatus as in claim 2 including:
an input circuit connected to said means for producing a second electric field; and,
an output circuit connected to said means for detecting, thereby to form a delay line.

6. Apparatus as in claim 5 including:
switching and transmission means for connecting said output circuit to said input circuit, thereby to form a recirculating delay line.

7. A body of selectively doped germanium cut in a (110) plane with its longitudinal axis corresponding to a selected [110] crystal axis of germanium;
means for applying a selected bias voltage along the longitudinal axis of said body of germanium;
means for producing a transverse domain in said body of germanium, said transverse domain traveling along said longitudinal axis in response to said bias voltage; and,
means for detecting the arrival of said transverse domain at another region of said body of germanium.

8. The structure of claim 7 in which said means for applying a selected bias voltage comprises:
a first pair of ohmic contacts, one contact mounted on each end of said body of germanium; and,
a voltage source connecting said ohmic contacts.

9. The structure of claim 8 in which said means for producing a transverse domain comprises:
a second pair of ohmic contacts, each contact in said second pair being placed on a selected side of said body diametrically opposite the other contact in said second pair, said second pair of contacts being located in a plane perpendicular to the longitudinal axis of said body.

10. The structure of claim 9 in which said means for detecting comprises:
a third pair of ohmic contacts, each contact in said third pair being placed on a selected side of said body diametrically opposite the other contact in said third pair and in a plane perpendicular to the longitudinal axis of said body, said third pair of contacts being located between said second pair of contacts and the low voltage contact in said first pair of ohmic contacts.

11. Apparatus as in claim 7 in which said body of germanium is doped with antimony to produce a donor concentration on the order of $5 \times 10^{14}$ cm.$^{-3}$.

12. Apparatus as in claim 7 in which said longitudinal axis corresponds within ±½ degree to a selected [110] axis of germanium.

13. Apparatus as in claim 7 in which said longitudinal axis corresponds within ±3 degrees to a selected [110] axis of germanium.

14. An oscillator comprising:
a two-ended body of selectively doped semiconductor material cut in a (110) plane with the longitudinal axis of said body corresponding within a selected number of degrees to a selected [110] axis of said material;
means for producing a selected bias field along the longitudinal axis of said sample;
first means for generating a transverse domain at one end of said body in response to a signal or a starting pulse, said domain traveling along said longitudinal axis in response to said bias field;
second means for generating said signal in response to the arrival of said transverse domain at the other end of said body;
means for amplifying, reshaping, and transmitting said signal to said first means for generating; and,
a source of said starting pulse.

15. Apparatus as in claim 14 in which said selectively doped semiconductor material is germanium with a donor concentration between about $4 \times 10^{14}$ cm.$^{-3}$ and about $1.5 \times 10^{15}$ cm.$^{-3}$.

16. An oscillator comprising:
a body of selectively doped semiconductor material cut in a (110) plane with the longitudinal axis of said body corresponding within a selected number of degrees to a selected [110] axis of said material;
input means for producing a transverse domain in one end of said body in response to a signal;
output means for detecting the arrival of said transverse domain at the other end of said body, and for generating said signal in response thereto; and,
feedback means for transmitting said signal from said output means to said input means.

17. Apparatus which comprises:
a body of selectively doped semiconductor material cut in a (110) plane with the longitudinal axis of said body corresponding within a selected number of degrees to a selected [110] axis of said material;
means for producing a first electric field substantially along said longitudinal axis; and,
means for producing a second electric field in the direction of the [100] axis in said body, thereby to produce a transverse domain along said [100] axis in said body, said domain traveling along said longitudinal axis in response to said first electric field.

(References on following page)

References Cited

UNITED STATES PATENTS

| | | | |
|---|---|---|---|
| 3,215,862 | 11/1965 | Erlbach | 331—107 X |
| 3,458,832 | 7/1969 | McGroddy et al. | 331—107 |

OTHER REFERENCES

Sasaki et al., Journal of Physics and Chemistry of Solids, 1959, vol. 8, pp. 250–256.

Erlbach, Physical Review, vol. 132, Dec. 1, 1963, pp. 1976–1979.

Erlbach et al., Physical Review Letters, vol. 8, Apr. 1, 1962, pp. 280–282.

Reik et al., Physical Review, vol. 126, June 1, 1962, pp. 1737–1746.

ROY LAKE, Primary Examiner

S. H. GRIMM, Assistant Examiner

U.S. Cl. X.R.

307—221, 304; 317—235; 330—5; 333—29